United States Patent
Liu et al.

(10) Patent No.: US 10,870,083 B2
(45) Date of Patent: Dec. 22, 2020

(54) PREPARATION, REGENERATION AND APPLICATION OF A CHELATING MICROFILTRATION MEMBRANE

(71) Applicant: Nanjing University, Nanjing (CN)

(72) Inventors: Fuqiang Liu, Nanjing (CN); Yanhong Zhang, Nanjing (CN); Li Song, Nanjing (CN); Wei Zhao, Nanjing (CN); Changqing Zhu, Nanjing (CN); Chen Ling, Nanjing (CN); Aimin Li, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 458 days.

(21) Appl. No.: 15/749,098

(22) PCT Filed: Jun. 15, 2017

(86) PCT No.: PCT/CN2017/088453
§ 371 (c)(1),
(2) Date: Jan. 30, 2018

(87) PCT Pub. No.: WO2018/129859
PCT Pub. Date: Jul. 19, 2018

(65) Prior Publication Data
US 2019/0009214 A1 Jan. 10, 2019

(30) Foreign Application Priority Data
Jan. 16, 2017 (CN) .......................... 2017 1 00295891

(51) Int. Cl.
| | | |
|---|---|---|
| B01D 61/14 | (2006.01) | |
| B01D 67/00 | (2006.01) | |
| B01D 71/34 | (2006.01) | |
| C02F 1/44 | (2006.01) | |
| C02F 101/20 | (2006.01) | |
| C02F 1/68 | (2006.01) | |

(52) U.S. Cl.
CPC ....... *B01D 61/147* (2013.01); *B01D 67/0016* (2013.01); *B01D 67/0093* (2013.01); *B01D 71/34* (2013.01); *C02F 1/444* (2013.01); *B01D 61/14* (2013.01); *B01D 67/009* (2013.01); *B01D 67/0011* (2013.01); *B01D 67/0013* (2013.01); *B01D 2323/18* (2013.01); *B01D 2323/38* (2013.01); *C02F 1/683* (2013.01); *C02F 2101/20* (2013.01)

(58) Field of Classification Search
None
See application file for complete search history.

(56) References Cited

U.S. PATENT DOCUMENTS 4,546,149 A * 10/1985 Kidoh ................ C08L 27/16
524/517

FOREIGN PATENT DOCUMENTS

| | | | |
|---|---|---|---|
| CN | 101439268 A | | 5/2009 |
| CN | 101537315 A | * | 9/2009 |
| CN | 101537315 A | | 9/2009 |
| CN | 101961648 A | | 2/2011 |
| CN | 103480347 A | | 1/2014 |
| CN | 103537204 A | * | 1/2014 |
| CN | 103537204 A | | 1/2014 |
| CN | 104028122 A | * | 9/2014 |
| CN | 104028122 A | | 9/2014 |
| CN | 105536551 A | | 5/2016 |
| CN | 106621842 A | | 5/2017 |
| KR | 20110008487 A | * | 1/2011 |
| KR | 20110008487 A | | 1/2011 |

\* cited by examiner

*Primary Examiner* — Krishnan S Menon
*Assistant Examiner* — Brad Gordon
(74) *Attorney, Agent, or Firm* — Bayramoglu Law Offices LLC

(57) ABSTRACT

A polyvinylidene fluoride (PVDF) casting membrane solution is shaped as a flat sheet membrane by thermally induced phase separation (TIPS), the PVDF membrane is defluorinated with an alkaline potassium permanganate solution, and then the carbon chain is extended with glycidyl methacrylate (GMA) as the graft monomer, and finally the nucleophilic substitution is carried out between melamine and GMA to produce a chelating microfiltration membrane for capturing and enriching heavy metals with high flux and high capacity.

8 Claims, No Drawings

PREPARATION, REGENERATION AND APPLICATION OF A CHELATING MICROFILTRATION MEMBRANE

CROSS REFERENCE TO RELATED APPLICATIONS

This application is the national phase entry of International Application No. PCT/CN2017/088453, filed on Jun. 15, 2017, which claims priority from the Chinese application no. 2017100295891 filed on Jan. 16, 2017, the entire contents of which are incorporated herein by reference.

TECHNICAL FIELD

The present invention relates to the field of heavy metal containing waste water treatment, particularly relates to the preparation, regeneration, and application of a chelating microfiltration membrane.

BACKGROUND

Along with the rapid development of industrialization process, a great quantity of waste water containing heavy metals (such as copper, nickel, lead, chromium, mercury, cadmium, etc.) became difficult to be treated effectively, incapable of being discharged up to the standard or being recycled. The heavy metal pollutants are harmful, non-biodegradable, and non-metabolizable, thus causing serious damages to the aquatic ecosystem, and polluting the sludge through sedimentation or physicochemical reaction after entering the water. The domestic and foreign-related standards of water environmental quality all have proposed strict emission limits of the heavy metal pollutants.
The conventional treatments of waste water containing heavy metals mainly include a coagulation-sedimentation process, an adsorption process, an ion exchange process, a membrane separation process and the assembly processes thereof. A large quantity of agents need to be input in the coagulation-sedimentation process, with a high operating fee and a heavy secondary pollution; a large quantity of adsorbents are consumed in the adsorption process, thus being difficult to apply in scale; the anti-pollution performance of the ion exchange process is poor, with a high processing cost. However, the membrane separation process has advantages of high separation efficiency, fast separation rate, simple equipment and easy to recycle, attracting much focus in the field of water treatment; nevertheless, there remain disadvantages of poor anti-pollution performance of the membrane and high investment cost.

It was demonstrated in the literature researches at home and abroad that, the current study and development of the treatment of waste water containing heavy metals is mainly focus on the modification of the ultrafiltration membrane or the nanofiltration membrane. The ultrafiltration membrane and the nanofiltration membrane both may entrap the heavy metal ions through the aperture screening principle, but such membranes have disadvantages of small flux and poor anti-pollution performance in practical application. In numerous membrane materials, polyvinylidene fluoride (PVDF) is a membrane material with excellent mechanical properties such as impact resistance, abrasion resistance, and cut resistance, and its modified membrane material may potentially remove heavy metal ions through adsorption or entrapment without decreasing the flux. Chinese Patent No. CN 201010533375.6, the publication date of Feb. 2, 2011, disclosed a membrane adsorbent for effectively removing the heavy metal ions in drinking water and its preparation process, in which a polymer was mixed and dissolved with a powdery cation-anion exchange resin to produce a flat sheet membrane and a hollow fiber membrane, which process was simple, but the membrane flux and adsorption capacity were low; Chinese Patent No. 201310479299.9, the publication date of Oct. 11, 2013, disclosed a preparation process of a composite flat sheet membrane for adsorbing heavy metal ions and its products, which process includes washing the water with tannic acid, modifying the attapulgite after acid washing, and then compositing with polyvinylidene fluoride, however, the modified membrane was poor in hydrophilcity, and the flux of pure water was decreased significantly compared with the PVDF membrane.

SUMMARY

The present invention is to overcome the technical problems such as the current commercial microfiltration membrane being most confined to the membrane bioreactor, the modification process of treating the heavy metal containing waste water with the modified products being complex, with poor improvement effects, low pure water flux, and poor anti-pollution performance, and to provide a preparation process of a chelating microfiltration membrane for capturing and enriching heavy metals with large flux and high capacity, a regeneration process and its application.

To dissolve the above described problems, the technical solution of the present invention is as follows:

A preparation process of a chelating microfiltration membrane, which includes the following steps:

A. Preparation of a polyvinylidene fluoride flat sheet membrane: to a reactor was first added 70~90 parts of solvent, then added 4~22 parts of pore-forming agent and 6~16 parts of polyvinylidene fluoride, which were stirred to be dissolved completely to give a casting membrane solution; the casting membrane solution was stirred and reacted for 1~44 h in the reactor, with the reaction temperature controlled at 50~100° C., after being settled and defoamed, which was shaped as a diaphragm by employing a thermally induced phase separation process, the diaphragm was soaked in distilled water for 1~3 h, and finally was dried to produce a polyvinylidene fluoride PVDF flat sheet membrane;

B. Defluorination: to the reactor were added the polyvinylidene fluoride flat sheet membrane obtained in step A and the alkaline potassium permanganate solution of low concentration, wherein the mass ratio of the flat sheet membrane and the solution was 1:20~1:50, with the temperature controlled at 10~100° C., the reaction was performed for 1~25 h, and then washed and dried;

C. Grafting glycidyl methacrylate: to the reactor were added the membrane which was defluorinated in step B and the solution of glycidyl methacrylate at a concentration of 0.5~5%, wherein the mass ratio of the flat sheet membrane and the solution was 1:20~1:50, into which were then added an initiator and a polymerization inhibitor, with the temperature controlled at 10~120° C., the reaction was performed for 1~25 h, and then washed and dried;

D. Melamine modification: to the reactor were added the membrane obtained in step C and the solution of melamine at a concentration of 0.1~5.0%, wherein the mass ratio of the flat sheet membrane and the solution was 1:20~1:50, with the temperature controlled at 10~120° C., the reaction was performed for 1~36 h, and then washed and dried.

Preferably, the solvent in step A of the preparation process of a chelating microfiltration membrane is any one of N-methylpyrrolidone, N,N-dimethylacetamide, trimethylolpropane, dimethyl phthalate, and triethyl phosphate.

Preferably, the pore-forming agent in step A of the preparation process of a chelating microfiltration membrane is any one of polyethylene glycol and polyvinyl pyrrolidone.

Preferably, the mass fraction of the alkaline potassium permanganate solution in step B of the preparation process of a chelating microfiltration membrane is 0.5~5%.

Preferably, the solvent in the solution of glycidyl methacrylate in step C of the preparation process of a chelating microfiltration membrane is any one of methanol, ethanol, n-propanol, isopropanol and toluene.

Preferably, the initiator in step C of the preparation process of a chelating microfiltration membrane is any one of 2,2-azoisobutyronitrile, ammonium persulfate, potassium persulfate, and benzoyl peroxide, with a concentration of 0.01~0.05%.

Preferably, the polymerization inhibitor in step C of the preparation process of a chelating microfiltration membrane is any one of methylhydroquinone, p-hydroxyanisole, and 2-tert-butylhydroquinone, with a concentration of 0.01~0.05%.

A regeneration process of the chelating microfiltration membrane prepared by the preparation process of a chelating microfiltration membrane, which includes the following steps: the chelating microfiltration membrane adsorbing heavy metals was soaked in a solution of hydrochloric acid, nitric acid or sulfuric acid at 0.001~1.0 M for 1~72 h, and then soaked and washed in deionized water for 1~72 h, thus recovering the heavy metal absorbing capacity of the chelating microfiltration membrane.

The chelating microfiltration membrane prepared by the preparation process of a chelating microfiltration membrane of the present invention may be used to remove heavy metals in water. Environment functional materials modified with polyamines have excellent removing property, large absorption capacity and good salt tolerance; the PVDF membrane after being modified with polyamines may enhance removing through the coordination of polyamine functional groups with heavy metal ions; and the PVDF membrane after being modified with polyamines has good hydrophilcity, having both effects of functional group coordination and membrane core entrapment, increasing the trapping rate and enhancing the enriching capacity; therefore, said membrane may broadly used for the efficient removal of heavy metals in the waste water in heavy metal-involved industries, the comprehensive waste water in industrial park, the polluted surface water, and the underground water.

Compared with the prior art, the technical solution of the present invention are advantageous in that:

(1) Defluorinating the PVDF membrane with alkaline potassium permanganate, grafting glycidyl methacrylate on the surface, and then modifying the graft through melamine nucleophilic substitution, to produce a PVDF flat sheet membrane; treating the PVDF membrane through the surface modification, effectively controlling the content of the surface functional groups and the pore size of the membrane in the condition of ensuring the membrane body structure and the mechanical strength; the flux of the PVDF microfiltration membrane after modification was higher than those of the modified products of the same kind, broadening the application ranges of the PVDF membrane;

(2) Materials needed for the membrane modification are easy to access, with low cost, and simple to prepare, suitable for industrial production;

(3) Through the effects of functional group coordination and membrane core entrapment of the membrane, multi-effect synergy during the water purification may be developed, achieving effective removal of heavy metals, with a bright applied prospect in removing heavy metals in the waste water in heavy metal-involved industries, the comprehensive waste water in industrial park, the polluted surface water, and the underground water;

(4) The surface modification process combined functional groups with the membrane surface by means of chemical bonds, in which process the stability was higher compared with the physical blending process in the condition of ensuring the mechanical performance of the membrane: the chelating microfiltration membrane absorbing heavy metals may be effectively regenerated by employing conventional acid solutions, and the regenerated flat sheet membrane still has excellent removing performance on different heavy metals after regeneration, and may be recycled.

DETAILED DESCRIPTION

To further illustrate the content of the present invention, the present invention will be described in detail in combination with the following examples, which was only used to illustrate the present invention, without limiting the application ranges of the present invention.

EXAMPLE 1

(1) Preparation of PVDF flat sheet membrane: to a reactor was first added 76 g N,N-dimethylacetamide, then added 9 g polyethylene glycol with a molecular weight of 400 and 15 g polyvinylidene fluoride PVDF, which were stirred to be dissolved completely to give a casting membrane solution; the casting membrane solution was stirred and reacted for 12 h in the reactor, with the temperature controlled at 80° C., after being settled and defoamed, which was shaped as a diaphragm by employing TIPS phase inversion process, after then the diaphragm was soaked in distilled water for 1 h, and finally was dried to produce a polyvinylidene fluoride PVDF flat sheet membrane;

(2) Defluorination: to the reactor were added the PVDF membrane produced in step (1) and the alkaline potassium permanganate solution of 1%, wherein the mass ratio of the flat sheet membrane and the solution was 1:20, with the temperature controlled at 80° C., the reaction was performed for 4 h, and then washed and dried;

(3) Grafting glycidyl methacrylate: to the reactor were added the membrane produced in step (2) and the solution of glycidyl methacrylate in methanol at a concentration of 2%, wherein the mass ratio of the flat sheet membrane and the solution was 1:50, into which were then added 2,2-azoisobutyronitrile and p-hydroxyanisole, the concentrations of which were respectively controlled at 0.01% and 0.05% , with the temperature controlled at 65° C., the reaction was performed for 5 h, and then washed and dried;

(4) Melamine ammoniation: to the reactor was added the solution of melamine at a concentration of 0.25%, wherein the mass ratio of the flat sheet membrane and the solution was 1:25, the membrane produced in step (3) was added into the reactor, with the temperature controlled at 70° C., the reaction was performed for 8 h, and then washed and dried;

(5) The above described chelating microfiltration membrane was placed in a cross flow membrane filtration system, the temperature of which was controlled at 25° C., the flux of pure water was detected as 646 L·m$^{-2}$·h$^{-1}$ after being pre-pressed for 30 min at a differential pressure of 0.2 MPa.

EXAMPLE 2

(1) Preparation of PVDF flat sheet membrane: to a reactor was first added 80 g triethyl phosphate, then added 4 g polyvinyl pyrrolidone with a molecular weight of 8000 and 16 g polyvinylidene fluoride PVDF, which were stirred to be dissolved completely to give a casting membrane solution; the casting membrane solution was stirred and reacted for 44 h in the reactor, with the temperature controlled at 100° C., after being settled and defoamed, which was shaped as a diaphragm by employing TIPS phase inversion process, after then the diaphragm was soaked in distilled water for 3 h, and finally was dried to produce a polyvinylidene fluoride PVDF flat sheet membrane;

(2) Defluorination: to the reactor were added the PVDF membrane produced in step (1) and the alkaline potassium permanganate solution of 0.5%, wherein the mass ratio of the flat sheet membrane and the solution was 1:35, with the temperature controlled at 10° C., the reaction was performed for 1 h, and then washed and dried;

(3) Grafting glycidyl methacrylate: to the reactor were added the membrane produced in step (2) and the solution of glycidyl methacrylate in toluene at a concentration of 0.5%, wherein the mass ratio of the flat sheet membrane and the solution was 1:25, into which were then added potassium persulfate and methylhydroquinone, the concentrations of which were respectively controlled at 0.02% and 0.01%, with the temperature controlled at 80° C., the reaction was performed for 1 h, and then washed and dried in air;

(4) Melamine ammoniation: to the reactor was added the solution of melamine at a concentration of 0.1%, wherein the mass ratio of the flat sheet membrane and the solution was 1:50, the membrane produced in step (3) was added into the reactor, with the temperature controlled at 100° C., the reaction was performed for 36 h, and then washed and dried;

(5) The above described chelating microfiltration membrane was placed in a cross flow membrane filtration system, the temperature of which was controlled at 25° C., the flux of pure water was detected as 597 L·m$^{-2}$·h$^{-1}$ after being pre-pressed for 30 min at a differential pressure of 0.1 MPa.

EXAMPLE 3

(1) Preparation of PVDF flat sheet membrane: to a reactor was first added 70 g trimethylol propane, then added 22 g polyethylene glycol with a molecular weight of 500 and 8 g polyvinylidene fluoride PVDF, which were stirred to be dissolved completely to give a casting membrane solution; the casting membrane solution was stirred and reacted for 1 h in the reactor, with the temperature controlled at 50° C., after being settled and defoamed, which was shaped as a diaphragm by employing TIPS phase inversion process, after then the diaphragm was soaked in distilled water for 2 h, and finally was dried in air to produce a polyvinylidene fluoride PVDF flat sheet membrane;

(2) Defluorination: to the reactor were added the PVDF membrane produced in step (1) and the alkaline potassium permanganate solution of 5.0%, wherein the mass ratio of the flat sheet membrane and the solution was 1:40, with the temperature controlled at 75° C., the reaction was performed for 25 h, and then washed and dried;

(3) Grafting glycidyl methacrylate: to the reactor were added the membrane produced in step (2) and the solution of glycidyl methacrylate in isopropanol at a concentration of 5.0%, wherein the mass ratio of the flat sheet membrane and the solution was 1:20, into which were then added ammonium persulfate and 2-tert-butyl hydroquinone, the concentrations of which were respectively controlled at 0.03% and 0.02%, with the temperature controlled at 30° C., the reaction was performed for 15 h, and then washed and dried;

(4) Melamine ammoniation: to the reactor was added the solution of melamine at a concentration of 5.0%, wherein the mass ratio of the flat sheet membrane and the solution was 1:35, the membrane produced in step (3) was added into the reactor, with the temperature controlled at 40° C., the reaction was performed for 16 h, and then washed and dried;

(5) The above described chelating microfiltration membrane was placed in a cross flow membrane filtration system, the temperature of which was controlled at 25° C., the flux of pure water was detected as 597 L·m$^{-2}$·h$^{-1}$ after being pre-pressed for 1 h at a differential pressure of 0.15 MPa.

EXAMPLE 4

(1) Preparation of PVDF flat sheet membrane: to a reactor was first added 90 g N-methylpyrrolidone, then added 4 g polyvinyl pyrrolidone with a molecular weight of 24000 and 6 g polyvinylidene fluoride PVDF, which were stirred to be dissolved completely to give a casting membrane solution; the casting membrane solution was stirred and reacted for 30 h in the reactor, with the temperature controlled at 75° C., after being settled and defoamed, which was shaped as a diaphragm by employing TIPS phase inversion process, after then the diaphragm was soaked in distilled water for 2 h, and finally was dried to produce a polyvinylidene fluoride PVDF flat sheet membrane;

(2) Defluorination: to the reactor were added the PVDF membrane produced in step (1) and the alkaline potassium permanganate solution of 3.0%, wherein the mass ratio of the flat sheet membrane and the solution was 1:50, with the temperature controlled at 100° C., the reaction was performed for 15 h, and then washed and dried;

(3) Grafting glycidyl methacrylate: to the reactor were added the membrane produced in step (2) and the solution of glycidyl methacrylate in ethanol at a concentration of 3.0%, wherein the mass ratio of the flat sheet membrane and the solution was 1:45, into which were then added benzoyl peroxide and p-hydroxyanisole, the concentrations of which were respectively controlled at 0.04% and 0.04%, with the temperature controlled at 40° C., the reaction was performed for 20 h, and then washed and dried;

(4) Melamine ammoniation: to the reactor was added the solution of melamine at a concentration of 5.0%, wherein the mass ratio of the flat sheet membrane and the solution was 1:20, the membrane produced in step (3) was added into the reactor, with the temperature controlled at 120° C., the reaction was performed for 1 h, and then washed and dried;

(5) The above described chelating microfiltration membrane was placed in a cross flow membrane filtration system, the temperature of which was controlled at 35° C., the flux of pure water was detected as 651 L·m$^{-2,-1}$ after being pre-pressed for 30 min at a differential pressure of 0.15 MPa.

EXAMPLE 5

(1) Preparation of PVDF flat sheet membrane: to a reactor was first added 85 g dimethyl phthalate, then added 5 g polyethylene glycol with a molecular weight of 400 and 10 g polyvinylidene fluoride PVDF, which were stirred to be dissolved completely to give a casting membrane solution; the casting membrane solution was stirred and reacted for 24 h in the reactor, with the temperature controlled at 85° C., after being settled and defoamed, which was shaped as a diaphragm by employing TIPS phase inversion process, after then the diaphragm was soaked in distilled water for 90 min, and finally was dried to produce a polyvinylidene fluoride PVDF flat sheet membrane;

(2) Defluorination: to the reactor were added the PVDF membrane produced in step (1) and the alkaline potassium permanganate solution of 4.5%, wherein the mass ratio of the flat sheet membrane and the solution was 1:30, with the temperature controlled at 50° C., the reaction was performed for 8 h, and then washed and dried;

(3) Grafting glycidyl methacrylate: to the reactor were added the membrane produced in step (2) and the solution of glycidyl methacrylate in n-propanol at a concentration of 1.8%, wherein the mass ratio of the flat sheet membrane and the solution was 1:45, into which were then added 2,2-azoisobutyronitrile and methyl hydroquinone, the concentrations of which were respectively controlled at 0.02% and 0.03%, with the temperature controlled at 10° C., the reaction was performed for 8 h, and then washed and dried;

(4) Melamine ammoniation: to the reactor was added the solution of melamine at a concentration of 3.0%, wherein the mass ratio of the flat sheet membrane and the solution was 1:40, the membrane produced in step (3) was added into the reactor, with the temperature controlled at 60° C., the reaction was performed for 4 h, and then washed and dried;

(5) The above described chelating microfiltration membrane was placed in a cross flow membrane filtration system, the temperature of which was controlled at 25° C., the flux of pure water was detected as 574 $L \cdot m^{-2} \cdot h^{-1}$ after being pre-pressed for 1 h at a differential pressure of 0.2 MPa.

EXAMPLE 6

(1) Preparation of PVDF flat sheet membrane: to a reactor was first added 75 g N,N-dimethylacetamide, then added 15 g polyvinyl pyrrolidone with a molecular weight of 10000 and 10 g polyvinylidene fluoride PVDF, which were stirred to be dissolved completely to give a casting membrane solution; the casting membrane solution was stirred and reacted for 10 h in the reactor, with the temperature controlled at 90° C., after being settled and defoamed, which was shaped as a diaphragm by employing TIPS phase inversion process, after then the diaphragm was soaked in distilled water for 150 min, and finally was dried to produce a polyvinylidene fluoride PVDF flat sheet membrane;

(2) Defluorination: to the reactor were added the PVDF membrane produced in step (1) and the alkaline potassium permanganate solution of 2.0%, wherein the mass ratio of the flat sheet membrane and the solution was 1:25, with the temperature controlled at 65° C., the reaction was performed for 12 h, and then washed and dried;

(3) Grafting glycidyl methacrylate: to the reactor were added the membrane produced in step (2) and the solution of glycidyl methacrylate in methanol at a concentration of 4.0%, wherein the mass ratio of the flat sheet membrane and the solution was 1:35, into which were then added potassium persulfate and 2-tert-butyl hydroquinone, the concentrations of which were respectively controlled at 0.05% and 0.01%, with the temperature controlled at 75° C., the reaction was performed for 25 h, and then washed and dried;

(4) Melamine ammoniation: to the reactor was added the solution of melamine at a concentration of 2.0%, wherein the mass ratio of the flat sheet membrane and the solution was 1:25, the membrane produced in step (3) was added into the reactor, with the temperature controlled at 10° C., the reaction was performed for 24 h, and then washed and dried;

(5) The above described chelating microfiltration membrane was placed in a cross flow membrane filtration system, the temperature of which was controlled at 20° C., the flux of pure water was detected as 678 $L \cdot m^{-2} \cdot h^{-1}$ after being pre-pressed for 30 min at a differential pressure of 0.1 MPa.

EXAMPLE 7

Regeneration of the Chelating Microfiltration Membrane

The chelating microfiltration membrane obtained in Example 1, after dynamic absorption and entrapment of heavy metal ions, was soaked in a solution of hydrochloric acid at a concentration of 0.5M for 36 h, then soaked in deionized water for 12 h and washed to neutral, thus recovering the heavy metal ion-absorbing capacity of the adsorption membrane.

The above described chelating microfiltration membrane was placed in a cross flow membrane filtration system, the temperature of which was controlled at 20° C., the flux of pure water was detected as 589 $L \cdot m^{-2} \cdot h^{-1}$ after being pre-pressed for 30 min at a differential pressure of 0.1 MPa.

EXAMPLE 8

Regeneration of the Chelating Microfiltration Membrane

The chelating microfiltration membrane obtained in Example 3, after dynamic absorption and entrapment of heavy metal ions, was soaked in a solution of nitric acid at a concentration of 0.001M for 72 h, then soaked in deionized water for 1 h and washed to neutral, thus recovering the heavy metal ion-absorbing capacity of the adsorption membrane.

The above described chelating microfiltration membrane was placed in a cross flow membrane filtration system, the temperature of which was controlled at 25° C., the flux of pure water was detected as 601 $L \cdot m^{-2} \cdot h^{-1}$ after being pre-pressed for 1 h at a differential pressure of 0.2 MPa.

EXAMPLE 9

Regeneration of the Chelating Microfiltration Membrane

The chelating microfiltration membrane obtained in Example 5, after dynamic absorption and entrapment of heavy metal ions, was soaked in a solution of sulfuric acid at a concentration of 1.0M for 1 h, then soaked in deionized water for 20 h and washed to neutral, thus recovering the heavy metal ion-absorbing capacity of the adsorption membrane.

The above described chelating microfiltration membrane was placed in a cross flow membrane filtration system, the temperature of which was controlled at 30° C., the flux of pure water was detected as 558 $L \cdot m^{-2} \cdot h^{-1}$ after being pre-pressed for 30min at a differential pressure of 0.15 MPa.

EXAMPLE 10

Regeneration of the Chelating Microfiltration Membrane

The chelating microfiltration membrane obtained in Example 6, after dynamic absorption and entrapment of heavy metal ions, was soaked in a solution of nitric acid at a concentration of 0.1M for 12 h, then soaked in deionized water for 72 h and washed to neutral, thus recovering the heavy metal ion-absorbing capacity of the adsorption membrane.

The above described chelating microfiltration membrane was placed in a cross flow membrane filtration system, the temperature of which was controlled at 25° C., the flux of pure water was detected as 659 $L·m^{-2}·h^{-1}$ after being pre-pressed for 30 min at a differential pressure of 0.2 MPa.

The absorption and entrapment effects on heavy metals of the heavy metal chelating microfiltration membrane produced in Examples 1-6 were presented in Table 1, it can be seen that the heavy metal chelating microfiltration membrane produced in the present invention possess excellent treatment effects on heavy metal containing waster water.

TABLE 1

The absorption and entrapment effects on heavy metals of the heavy metal chelating microfiltration membrane produced in Examples 1-6

|  | Type of the heavy metal | Initial Concentration, mg/L | Removing rate % | Type of the heavy metal | Initial Concentration, mg/L | Removing rate % |
| --- | --- | --- | --- | --- | --- | --- |
| Example 1 | copper | 6.3 | 100 | zinc | 8.4 | 99.8 |
| Example 2 | cadmium | 10.2 | 98.6 | lead | 19.5 | 97.3 |
| Example 3 | nickle | 5.8 | 99.7 | chromium | 5.2 | 98.9 |
| Example 4 | cobalt | 5.9 | 99.6 | nickle | 5.5 | 99.9 |
| Example 5 | copper | 6.7 | 99.7 | iron | 5.5 | 99.1 |
| Example 6 | chromium | 4.9 | 98.2 | lead | 21.3 | 98.8 |

The absorption and entrapment performances on heavy metals of the same chelating microfiltration membrane before and after regeneration were presented in Table 2, it can be seen that the heavy metal chelating microfiltration membrane produced in the present invention possess excellent regeneration ability, with a simple regeneration process, and allowing for the industrial application.

TABLE 2

The absorption and entrapment performances on heavy metals of the same chelating microfiltration membrane before and after regeneration

|  | Type of the heavy metal | Initial Concentration, mg/L | Removing rate % | Type of the heavy metal | Initial Concentration, mg/L | Removing rate % |
| --- | --- | --- | --- | --- | --- | --- |
| Example 1 | lead | 15.4 | 98.6 | copper | 5.7 | 99.1 |
| Example 2 | nickle | 6.3 | 99.8 | cadmium | 9.8 | 98.4 |
| Example 3 | chromium | 4.9 | 98.9 | zinc | 6.3 | 98.7 |
| Example 4 | cobalt | 5.4 | 99.5 | lead | 16.1 | 97.5 |
| Example 5 | copper | 6.5 | 98.8 | nickle | 5.4 | 97.8 |
| Example 6 | iron | 5.5 | 97.6 | chromium | 5.2 | 99.2 |

It is needed to illustrate that the above examples are only the preferred examples of the present invention, which are not used to confine the scope of the present invention, and the equivalent exchanges or substitutions on the basis of which are all in the scope of the present invention.

What is claimed is:

1. A preparation method of a chelating microfiltration membrane, comprising:
   A. preparing a polyvinylidene fluoride flat sheet membrane: adding 70-90 parts of a solvent into a reactor, then adding 4-22 parts of a pore-forming agent and 6-16 parts of polyvinylidene fluoride, then dissolving completely to form a casting membrane solution; stirring and reacting the casting membrane solution for 1-44 h in the reactor, wherein the reaction temperature is controlled at 50-100° C.; wherein the casting membrane solution, after being settled and defoamed, is shaped as a diaphragm by employing a thermally induced phase separation process; soaking the diaphragm in distilled water for 1-3 h, and finally drying to produce a polyvinylidene fluoride PVDF flat sheet membrane;
   B. deflourination: adding the polyvinylidene fluoride flat sheet membrane obtained in step A and a low concentration alkaline potassium permanganate solution to the reactor, wherein a mass ratio of the flat sheet membrane and the alkaline potassium permanganate solution is 1:20-1:50, with a temperature controlled at 10-100° C., performing the reaction for 1-25 h, and then washing and drying to obtain a deflourinated flat sheet membrane;
   C. grafting glycidyl methacrylate: adding the deflourinated flat sheet membrane obtained in step B and a solution of glycidyl methacrylate at a concentration of 0.5-5% to the reactor, wherein a mass ratio of the deflourinated flat sheet membrane and the solution of glycidyl methacrylate is 1:20-1:50, then adding an initiator and a polymerization inhibitor, wherein the temperature is controlled at 10-120° C., and the reaction is performed for 1-25 h, and then washing and drying to obtain a grafted flat sheet membrane;
   D. melamine modification: adding the grafted flat sheet membrane obtained in step C and a solution of melamine at a concentration of 0.1-5.0% to the reactor, wherein a mass ratio of the grafted flat sheet membrane and the solution of melamine is 1:20-1:50, with the temperature controlled at 10-120° C., performing the reaction for 1-36 h, and then washing and drying.

2. The preparation method of a chelating microfiltration membrane according to claim 1, wherein the solvent in step A is one selected from the group consisting of N-methyl pyrrolidone, N,N-dimethyl acetamide, trimethylolpropane, dimethyl phthalate, and triethyl phosphate.

3. The preparation method of a chelating microfiltration membrane according to claim 2, wherein the pore-forming agent in step A is one selected from the group consisting of polyethylene glycol and polyvinyl pyrrolidone.

4. The preparation method of a chelating microfiltration membrane according to claim 3, wherein a mass fraction of the alkaline potassium permanganate solution in step B is 0.5-5%.

5. The preparation method of a chelating microfiltration membrane according to claim 4, wherein the solvent in the solution of glycidyl methacrylate in step C is one selected from the group consisting of methanol, ethanol, n-propanol, isopropanol and toluene.

6. The preparation method of a chelating microfiltration membrane according to claim 5, wherein the initiator in step C is one selected from the group consisting of 2,2-azoisobutyronitrile, ammonium persulfate, potassium persulfate, and benzoyl peroxide, with a concentration of 0.01-0.05%.

7. The preparation method of a chelating microfiltration membrane according to claim 6, wherein the polymerization inhibitor in step C is one selected from the group consisting of methylhydroquinone, p-hydroxyanisole, and 2-tert-butyl-hydroquinone, with a concentration of 0.01-0.05%.

8. The preparation method of a chelating microfiltration membrane according to claim 1, further comprising a regeneration process including soaking the chelating microfiltration membrane in a solution of hydrochloric acid, nitric acid or sulfuric acid at 0.001-1.0 M for 1-72 h and then soaking and washing in deionized water for 1-72 h.

* * * * *